Sept. 7, 1937.  B. D. DOGGETT  2,092,110
PROTECTIVE COVERING FOR BATTERIES
Filed Aug. 20, 1936
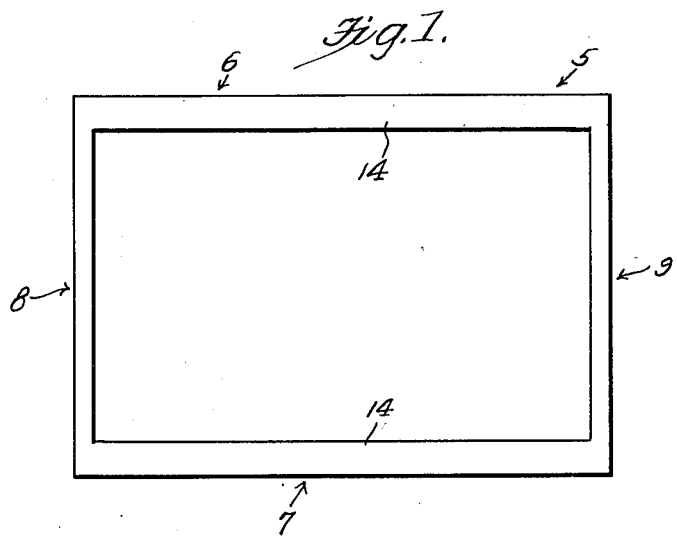
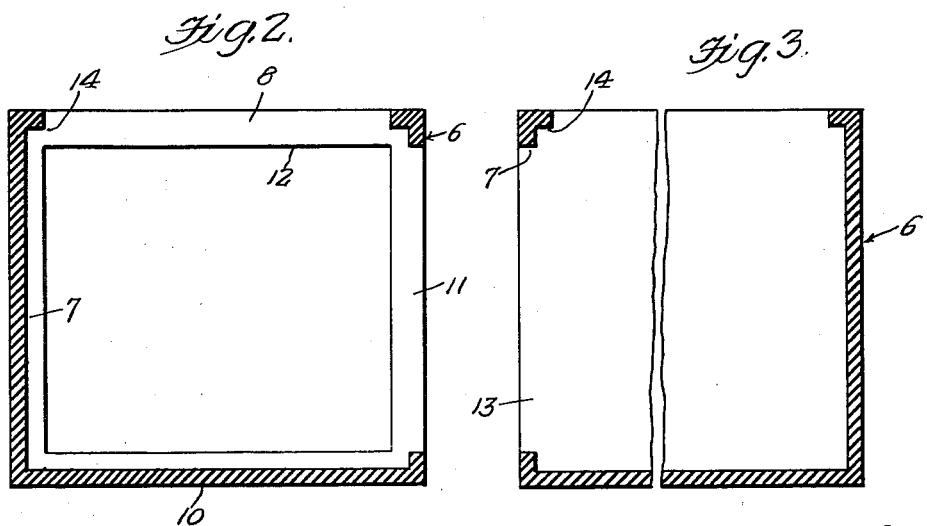
Inventor
Brewster D. Doggett,
By Clarence A. O'Brien
Hyman Berman
Attorneys Patented Sept. 7, 1937

2,092,110

UNITED STATES PATENT OFFICE 2,092,110

PROTECTIVE COVERING FOR BATTERIES

Brewster D. Doggett, Boston, Mass.

Application August 20, 1936, Serial No. 97,046

1 Claim. (Cl. 150—52)

This invention relates broadly to storage batteries and more particularly to the provision of a device to be applied to the battery box in a manner to guard the box and cells of the battery against the various stresses and strains incident to the movement of the vehicle and also to guard the box and contents thereof against damage due to the same being forceably struck by stones or the like incident to the movement of the vehicle over rough or gravel roads.

Briefly the invention consists in the provision of a covering of box-like form which can be readily and quickly slipped onto the box of the battery to protect and safeguard the same in the manner above suggested.

The invention together with its objects and advantages will be best understood from a study of the following description taken in connection with the accompanying drawing wherein:—

Figure 1 is a top plan view of the protective covering, and

Figures 2 and 3 are transverse sectional views therethrough.

Referring to the drawing by reference numerals it will be seen that the protective covering indicated generally by the reference numeral 5 is of box-like structure and of suitable dimensions to receive therein the box of a storage battery. The covering 5 is formed wholly of rubber or analogous material and includes side walls 6 and 7 and end walls 8 and 9. Integral with the lower edges of the walls 6, 7, 8 and 9 is a bottom wall 10. As shown in Figure 2, one of the side walls, for example the side wall 7, may be in the form of a sheet of rubber forming as it were a solid side wall for the covering while the opposite side wall, for example the side wall 6, has the main body or intermediate portion cut or otherwise removed therefrom so as to present an enlarged opening 11 through which the adjacent side of the battery box is exposed. Also, in this form of the invention, one of the end walls, for example the end wall 9, may also be in the form of an integral sheet of rubber or analogous material while the other of the end walls, for example the end wall 8, may have the main body portion thereof removed so as to present an enlarged opening through which the adjacent end wall of the battery box is exposed.

On the other hand, and if desired, each of the end walls 8 and 9 and one of the side walls, for example side wall 6, may be respectively formed of a single sheet of rubber thus presenting a pair of solid end walls and one solid side wall, while the opposite side wall, in this instance the side wall 7, has its main body portion removed to provide an enlarged opening 13 through which one side only of the battery box is exposed.

In each form of the invention the side walls of the box at their upper edges are provided with inturned flanges 14 adapted to overlie the edges of the corresponding side walls of the battery box and thus serve as a positive retaining means for retaining the battery box within the covering.

From the above it will be seen that a protective covering embodying the features of the present invention may be readily placed on the box of a storage battery and when so positioned thereon will serve as a positive protective receptacle for the box to prevent damage to the box or to the cell contents of the battery box incidental to sharp jars or impacts to which the box and the contents may be subjected due to the movements of the vehicle over rough roads or as a result of flying stones, or the like.

It is thought that a clear understanding of the construction, utility and advantages of an invention of this character will be had without a more detailed description.

Having thus described the invention what is claimed as new is:—

A protective covering for storage batteries comprising a box-like casing formed entirely of rubber, opened at its top, and having a bottom wall, side walls, and end walls, and said side walls at the upper edges thereof being provided with inwardly directed flanges to partly overlie and engage the upper edges of the side walls of the battery box for retaining the latter within said protective covering, and certain of the side and end walls of the cover being solid and opaque and the remaining side and end walls being of substantially skeleton frame structure having right angle flanges partly overlying and engaging the marginal edges of the battery box.

BREWSTER D. DOGGETT.